Patented Aug. 30, 1927.

1,640,612

UNITED STATES PATENT OFFICE.

ERNEST THEODORE McGREGOR, OF VANCOUVER, BRITISH COLUMBIA, CANADA.

PROCESS FOR THE RECOVERY OF PULP FROM PRINTED WASTE PAPER.

No Drawing.   Application filed June 21, 1926. Serial No. 117,570.

The invention relates to a process for the recovery of pulp from printed waste paper, or the like, wherein printed waste paper stock is first treated with a trisodium phosphate, ($Na_3PO_4$) solution after which it is subjected to pulping, beating and washing respectively, for the complete removal of inks, sizing, etc., from the paper stock, and has for its object to render the process more expeditious, cheaper, giving greater efficiency and less waste.

Many methods have been devised, some of which are in use at the present time, and such processes are divided into three classes:

Mechanical processes, wherein a discolored pulp is produced, the complete removal of the inks not being attained.

Chemical processes, employing the open tank cooking process, wherein the papers, after sorting, dusting and shredding, are delivered to cooking tanks containing a solution of soda ash, or caustic soda, and treated under steam pressure from ten to fifteen hours.

Combined mechanical and chemical process, wherein the rotary boiler process is employed, and the papers, after sorting, dusting and special shredding, are fed into a large rotary boiler containing a solution of soda ash and caustic soda, or lime, or soap, the boiler is rotated for a period of six to ten hours, steam being injected for the cooking. This process results in the de-fibering and de-inking of the paper, but is not positive in its action.

Cooking engine process, wherein the papers, after sorting and dusting, are fed into an elliptical shaped tub divided down the center by a mid-feather, and in one side of the channel is a propeller. A dilute solution of soda-ash is run into the engine; the solution being heated by steam for one and a half hours, and the cooking requiring two hours, or more.

In all the above methods, after the papers have been cooked, they are put through a washing process, several methods being employed—the most general being the washing engine, which comprises a beater shaped tub, a circulating roll equipped with knives and octagonal drum shaped cylinders, application of a continued stream of water being required for the dilution of the impurities of the cooking process. In this operation the removal of the inks and carbon takes place.

The pulp after being washed, is transferred to the bleachers, which contain a liquid of bleaching powder and water heated to 80 degrees, and after immersion in this liquid for some thirty minutes, is then transferred to screens and dryers.

Summarizing all of the above methods, it will be found that costly machinery, including a steam plant, is necessary, involving much skilled labor; the entire process covering a long period for complete reclamation of the pulp at an excessive cost, with loss by shrinkage of some thirty to forty per cent, and the uncertainty of the successful and complete removal of ink, etc., from the paper.

In my method I employ the combined chemical and mechanical process, wherein the printed waste paper stock, after sorting into pre-determined grades, is placed in a tank adjacent the sorting tables. This tank contains cold water, and for every two thousand pounds of paper stock placed therein, ten pounds of trisodium phosphate, ($Na_3PO_4$) is used. The paper stock may remain in the tank one minute, or any longer time desired, without injury to the pulp fiber; here the action of loosening, but not removing the sizing contained in the paper, takes place. It might here be mentioned that the pulp fibers do not carry any of the inks, these are retained in the sizing. Due to the chemical used in this operation, a bleaching action of the paper takes place.

By means of a conveyor the soaked paper stock is carried and delivered to a mechanical pulper positioned adjacent the soaking tank, where it falls upon a slatted conveyor, the said slats being ribbed or corrugated, and positioned above the said slats are a plurality of specially constructed spring held plates, the underside of which are corrugated to correspond with the aforesaid corrugated conveyor slats. The paper is now carried on conveyor slats beneath the aforementioned the conveyor beneath the aforementioned plates whereby a rubbing action is given, causing the paper stock to assume a pulpy mass wherein the sizing, ink and fibers are mixed, due to the fact that in the operation of rubbing, or pulping, fresh water is being sprayed between the aforementioned plates causing the whole mass to become a gelatinous substance, being delivered from the pulper into a beater positioned beneath said pulper. The said beater comprises a plurality of horizontally positioned rotary beaters—these beaters are operated at a high speed. The beater tank after being filled with paper stock, great agitation is imparted to the water by means of the speed of the beaters, the gelatinous pulp being carried through and between the beaters is delivered to a centrifugal pump. During the operation of beating, the pulp will receive a certain amount of washing, here the water changes color, the sizing gathering the inks, carbons, etc., and the fibrous pulp separating therefrom. This action is not apparent upon leaving the tank, and when the mass, which is of slushy consistency, is delivered from the beater it contains many knots, the centrifugal action of the pump breaking up these knots and delivering the mass to the washing tank at the bottom of said tank. This tank comprises a screen casing, within which is operating a helical screw. By means of the screw and an influx of water the pulp is carried to the top and discharged therefrom, clean and freed of all impurities; the said impurities being washed out through the screen in liquid form, due to fresh water being admitted at a point adjacent the intake; the impurities in liquid form being run off from a container tank within which the screen tank is positioned.

By my method it will be seen that the entire process employs only cold water, thereby eliminating the use of steam for cooking methods. A further feature is that I begin the operation of disintegration of the sizing containing the carbons and inks, from the pulp fiber before pulping. Another feature of this operation is also the fact that no matter how long the paper stock remains in the solution, no injurious effects result to the fibers, and by the special method I have of pulping, I cause the separation of the sizing containing the inks and carbons from the fibers without injury to the said fibers, as the fibers are never at any time during the complete operation brought between two unresisting surfaces. By the method of beating I cause a thorough washing and complete separation of the fibers from the sizing and by means of a pump I eliminate all knotting of the fibers. By my washing process I cause the flotation of the sizing, inks, carbons, etc., in solution away from the pulp which at the point of discharge is clean and free of all impurities, to be delivered to screens for drying, or to stuff chests in the paper mill.

My method is efficient, requiring no skilled labor. The action of the separation of sizing containing the carbons and oils is positive, and the bleaching properties of the chemical assuring clean and white pulp. There is no injury to the pulp fibers. The mechanical means employed are simple and can be installed at a reasonable cost. There is no necessity, by the use of my process, for the dusting and shredding of the paper stock; the entire process is continuous resulting in large output; cold water being employed in all operations the great expense involved in installation of a steam plant is eliminated.

What I claim is:

1. In a process for the recovery of pulp from printed waste papers by treating the said papers in a trisodium phosphate, ($Na_3Po_4$) solution, the said solution being kept cool, then pulping, beating, unknotting and washing in clear, fresh, cold water whereby the pulp is freed of all impurities.

2. In a process for the recovery of pulp from printed waste papers by treating such papers in a solution of approximately ten pounds of trisodium phosphate, ($Na_3Po_4$), to two thousand pounds of papers, with sufficient cold water for their immersion therein, then pulping, beating, unknotting and finally separating by washing in clear fresh cold water all impurities from said pulp.

3. In a process for the recovery of pulp from printed waste papers by treating such papers with a solution of trisodium phosphate, ($Na_3Po_4$), said solution being kept cold, then causing said paper stock to to be pulped into a gelatinous mass, causing the separation of the sizing, inks, carbons and fibers one from the other, then subjecting said gelatinous mass to beating, unknotting and final separation by washing in clear fresh cold water all impurities from said pulp.

4. In a process for the recovery of pulp from printed waste papers by treating such papers with a solution of trisodium phosphate, ($Na_3Po_4$), said solution being kept cold, then causing said paper stock to be pulped into a gelatinous mass, said mass comprising pulp fiber, sizing, inks and carbon, then subjecting said gelatinous mass to action of beating, whereby separation of sizing, inks and carbon from pulp fiber takes place, then unknotting of fibers and complete separation by washing in clear fresh cold water, of all impurities from said pulp.

5. In a process for the recovery of pulp from printed waste papers by treating such papers with a solution of trisodium phosphate, ($Na_3Po_4$), said solution being kept cold, then causing said paper stock to be pulped into a gelatinous mass, then subjecting said gelatinous mass to a beating operation in cold water producing a pulp slush, then subjecting said pulp slush to a centrifugal action adapted to unknot all pulp fibers, then subjecting the unknotted slush mass to a washing operation in clear fresh cold water, for complete removal of all impurities from said pulp.

6. In a process for the recovery of pulp from printed waste papers by treating such papers with a solution of trisodium phosphate, $(Na_3Po_4)$, said solution being kept cold, then causing said paper stock to be pulped into a gelatinous mass, then subjecting said gelatinous mass to a beating operation in cold water, adapted to reduce said gelatinous mass to a pulp slush, then subjecting said pulp slush to centrifugal action causing the unknotting of pulp fibers, then subjecting resulting pulp slush to washing in clear cold water wherein the sizing, carbon and inks contained in the slush are floated away and the clean pulp freed from all impurities, and delivered to the stuff chests or screens.

7. In a process for the recovery of pulp from printed waste papers wherein a solution of trisodium phosphate, $(Na_3Po_4)$, is used to commence the action of loosening the sizing containing inks, oils and carbons from the pulp fiber, and at the same time cause a bleaching action on said pulp fiber; the said pulp thereafter being subjected to the operation of pulping, beating, unknotting and washing, to produce the complete separation of aforesaid sizing, inks and carbons from the pulp in a continuous manner.

Vancouver, B. C., June 15, 1926.

ERNEST THEODORE McGREGOR.